United States Patent [19]

Ohno et al.

[11] 4,341,841

[45] Jul. 27, 1982

[54] MULTI-LAYER COATING PROTECTIVE FILM FORM

[75] Inventors: Akira Ohno; Shitomi Katayama; Suguru Nomura; Susumu Senaha; Suizo Kyo; Susumu Shimomura; Akira Akagami; Hiroshi Imai, all of Yokohama, Japan

[73] Assignees: NHK Spring Co., Ltd.; Yokohama Kiko Co., Ltd., both of Kanagawa, Japan

[21] Appl. No.: 93,563

[22] Filed: Nov. 13, 1979

[30] Foreign Application Priority Data

Nov. 13, 1978 [JP] Japan .................... 53-138907

[51] Int. Cl.$^3$ .................... G02B 5/08; B32B 17/10; B32B 15/08
[52] U.S. Cl. .................... 428/414; 428/412; 428/415; 428/416; 428/417; 428/426; 428/427; 428/428; 428/429; 428/432; 428/433; 428/434; 428/447; 428/450; 428/446; 428/457; 428/458; 428/460; 428/463; 428/469; 428/472; 428/913; 350/288; 350/292; 350/330
[58] Field of Search ............... 428/429, 446, 469, 472, 428/432, 433, 434, 447, 426, 913, 457, 458, 460, 463, 427, 450, 412, 415, 414, 416, 417, 461, 428; 350/320, 288, 292

[56] References Cited

U.S. PATENT DOCUMENTS

| | | | |
|---|---|---|---|
| 2,519,722 | 8/1950 | Turner | 350/320 |
| 2,676,117 | 4/1954 | Colbert | 350/288 |
| 3,026,177 | 3/1962 | St. Pierre | 350/288 X |
| 3,026,210 | 3/1962 | Coble | 350/288 X |
| 3,398,040 | 8/1968 | Allen | 350/288 X |
| 3,410,636 | 11/1968 | Herrich | 350/288 |
| 3,610,741 | 10/1971 | Darres | 350/320 |
| 3,687,713 | 8/1972 | Adams | 350/288 |
| 3,837,895 | 9/1974 | Pryor | 428/429 |
| 4,009,947 | 3/1977 | Nishada | 350/288 |

FOREIGN PATENT DOCUMENTS

| | | | |
|---|---|---|---|
| 653550 | 12/1962 | Canada | 428/429 |
| 618610 | 7/1978 | U.S.S.R. | 350/320 |

*Primary Examiner*—Ellis P. Robinson
*Attorney, Agent, or Firm*—Sughrue, Mion, Zinn, Macpeak & Seas

[57] ABSTRACT

An article with multi-layer protective coatings, comprising a substrate and two protective coating layers, in which said protective coating layers consist of a vacuum-coated ceramic layer and a resin layer, coated in any desired order.

13 Claims, No Drawings

MULTI-LAYER COATING PROTECTIVE FILM FORM

DETAILED DESCRIPTION OF INVENTION

The present invention relates to protective coatings applied on the substrate. More particularly, the present invention relates to articles with protective coatings having improved resistance to heat, light, oil and chemicals.

Articles with a protective coating, such as a resin layer or an inorganic layer (for example, porcelain enameled articles), are well known. However, the articles with a resin layer coated on the substrate suffer from poor resistance to heat, light, weathering, chemicals and abrasion; the resin layer tends to discolor or lose its transparency after a long time of use, and scratches may often develop when wiped with a cloth or the like for cleaning. The resin layer is usually formed by the application of a resin solution, followed by evaporation of the solvent used and curing. This causes solvent environmental pollution problems in the manufacturing process, requiring a solvent recovery unit. When the substrate surface is smooth, coating is good another problem is the difficulty in uniform coating on uneven or patterned surfaces; the applied coating resin may sag or fill the concave surfaces and valleys of the patterned surface. In addition, the coating thickness is usually large, resulting in higher absorption of light and infrared rays. As a result, the surface temperature rise will occur, accelerating the deterioration of physical properties of the resin.

Porcelain-enameled articles, on the other hand, are weak to impact loads, and corrosion or erosion starts at the cracks formed.

The present invention has been accomplished to overcome the aforementioned conventional disadvantages. When a resin layer and an inorganic vacuum coated layer are disposed in 2 layers, an excellent protective film body is obtained. And as resin in the resin layer there is high-aryl silicone resin of 65–100% a mole percentage of aryl radical/(alkyl radical+aryl radical). The high aryl-content silicone resin herein referred to means a heat-cured polyarylpolyalkylsiloxane defined in our prior application, Japanese Patent Application No. 038409 (1978), which has a mole percent of aryl radical/(aryl radical+alkyl radical) ranging from 65 to 100 mole %, bearing two to three polymerizable functional groups, and having a carbon to silicon ratio of 4.25 to 16. If the molar percentage of the aryl radicals mentioned above is less than 65%, the disadvantage that the heat resistance of the cured film will be poorer. Setting the number of functional groups to 2-3 is to simplify application of resin and to polymerize or cure by heating after the coating.

As compared with the conventional silicone resin having many alkyl groups, this high aryl silicone resin has high hardness and the following various kinds of excellent performances:

(1) Silicone resin having a high aryl content, which has not so far been found is, as compared with conventional silicone resins having alkyl groups alone or many alkyl groups, excellent in heat resistance, stands the use with the time at 250° C. or below and constant as high as temperatures of 250°–600° C. unless for long hours. And it is excellent in light-, weather-, chemical- and water resistance.

(2) It has a sufficient adhesion to the substrate.

(3) It is excellent in vacuum coating of a light-reflective metal and particularly vacuum coating at elevated temperature is almost unporalled.

(4) As it its refractivity is similar to chose of glass and quartz, when it is coated on them, there is little coating touch.

(5) A film colorless and transparent, coating having a high light-transmissibility is obtained.

(6) Bending resistance is very high and there are almost no cracks or peeling off of coatings due to bending.

(7) Processibility at manufacture is good and there is little or no environmental pollution problem.

The resin in the present invention has the above-mentioned properties and can be utilized in the heat-resistant uses and various new fields in which it was difficult to use the conventional silicone resin having a high content of alkyl groups. It has been found that when inorganics of the vacuum coated layer are ceramics, the effectiveness is high. That is, as opposed to amorphous silica and glasses, the vacuum-coated ceramic protective film body in the present invention have the following features because of their crystalline nature:

(1) Uniform vacuum coating can be easily achieved on articles of complicated configuration or having deep recesses, which is difficult with silica or glasses.

(2) Appropriate types of substrates and ceramic materials can be selected and combined depending on the intended uses and for higher affinity, producing protected articles with high density, strong adhesion, excellent inertness to solvents, water and chemicals, as well as a prolonged service life.

(3) In addition to being a protective coating for the substrate, the vacuum-coated ceramic layer is able to impart the article with other useful properties. For example, some ceramics of low oxidation degree is electrically conductive and can be made unti-fogging properties by conducting electricity. It is also possible to provide translucency or random reflectivity of light.

(4) Coloring agents must be added to obtain colored silica or glass, whereas various colored ceramics are readily available. By using these naturally colored ceramic materials, products of various colors can be easily obtained.

The substrate in the present invention means not only plate-shaped or sheet-shaped articles, but also include articles of various configuration. Both metallic and nonmetallic substrates can be used in the present invention. Typical examples of metallic substrates are metals and alloys, such as iron, stainless steel, copper, brass, bronze, nickel, aluminum and duralumin; and plates the surface of which is coated with metal such as galvanized and tinned iron plates.

As nonmetals for the substrate, the ones vacuum-coated with an inorganic substance, in the 2nd layer as in 1, 2, 3 and 4 protective films in Table 1, that will produce low molecules having high vapor pressure such as water under the reduced pressure used in vacuum coating, or subject to decomposition, cannot be used for the purpose of the present invention. As examples of the nonmetallic substrates that can be used may be mentioned, among others, stable polymeric materials such as epoxy resin, polyester resin, melamine resin, silicone resin, acrylic resin, polycarbonate resin, polyurethane resin, and fluorocarbon resin; glass; ceramics; mica; and stones. However, they are not limitative. In cases where a polymeric nonmetal substrate is completely covered by resin, as in 5, 6, 7 and 8 in Table 1, the above conditions are eased and in addition to the above materials, slate, wood, paper, etc, can also be employed. A substrate whose surface is slightly uneven or has minute pinholes can be smoothed out by coating with a resin, followed by vacuum coating with a crystalline ceramic or an amorphous glass containing silicon, thus forming a substrate with high smoothness. As examples of crystalline ceramics used in the present invention may be mentioned, among other, oxide ceramics such as alumina, magnesia, zirconia and spinel; idiolite ceramics such as cordierite; high alumina ind mullite ceramics; zirconium ceramic and steatite ceramics; titanium oxide ceramics; and celsian ceramics. They are not limitative. These ceramics generally form crystalline layers after vacuum coating. Oxide ceramics, and mullite ceramics are preferably used when resistance to heat and acids are required. Fayalite and serpentine ceramics are suitable when resistance to alkalis is needed. It is preferable to use idiolite ceramics or lithian ceramics for high temperature use, and when extremely low thermal expansion and contraction are required, lithian ceramics such as pyroceram are preferably used. These ceramics are light transmissible when coated, through which the color and pattern of the substrate can be seen.

When protection only is intended for and there is no need to see through the substrate, opaque or colored ceramics as listed below can also be used. As examples of these ceramics may be mentioned carbides, borides, nitrides, silicides, oxides such as ferrite, and their cermets.

1. Oxide cermets (anhydrous)
   30 $Al_2O_3$ + 70 Cr
   70 $Al_2O_3$ + 30 Cr
   70 BeO + 30 Be
2. Carbide cermets
   Tiatnium carbide (80 TiC + 20 Cr)
   Chromium carbide
   Beryllium carbide
   Tungusten carbide
3. Boride cermets
   $ZrB_2$ Zircomium boride
   $TiB_2$ Titanium boride
   85 $CrB_2$ + 15 Ni
4. Silicide cermets
   $MoSi_2$ + 6% Co
   $TiSi_2$
5. Nitride cermets
   $B_4N$ Boron nitride
   TiN Titanium nitride
   $Cr_2N$, CrN Chromium nitride
   SiN Silicon nitride The second layer (the first protective layer) of the protected articles of the present invention consists of vacuum-coated inorganic layer or a resinous layer. Embodiments 1, 2, 3 and 4 in Table 1 in which the second layer is a vacuum-coated inorganic layer will be first described. Any inorganic substances that can be vacuum-coated may be used in embodyments 1 and 2. These include amorphous silicious materials such as silicon oxides (silicon dioxide, rock crystal and quartz) and glass (sodium glass, potassium glass, lead glass, borosilicate glass and aluminosilicate glass). When transparency is not required, opaque or colored substances as listed below may also be used.

Of these, colored glass that can be employed are:

Red: gold red glass, copper red glass, selenium red glass
Yellow: silver yellow glass
Blue: cobalt oxide glass
Violet: nickel oxide glass
Green: chromium oxide glass
Opal: glass containing fluorides and other opacifiers (NaF, $NaAlF_6$, $CaF_2$, $SnO_2$, $Sb_2O_3$, $As_2O_3$, $ZrO_2$, $TiO_2$, etc.)

As the resin materials used as the protective film, may be mentioned, among others, epoxy resin, polyester resin, allyl resin, phenol resin and silicone resin. It is preferable to coat these resins by known processes solvent-free followed by curing by heating, such as baking. However, solution coating bellowed by solvent evaporation, electrostatic coating, film lamination, or other wet coating processes followed by drying (though not favorable) may also be used. They are not limitative.

This protective film will be subjected to direct exposure to the atmosphere air, and requires resistance to weathering, moisture, solvents, chemicals, heat, etc. Hence, it is preferable to use a high aryl-contant silicone resin as defined in our prior application, Japanese Patent Application No. 038409 (1978). Particularly, a high aryl-content polyarylpolyalkylsiloxane having an aryl radical/(aryl radical + alkyl radical) ratio of 65 to 100% in molar basis, bearing two to three polymerizable functional groups, and having a carbon to silicon ratio of 4.25 to 16, is most preferable. As the methods of vacuum coating inorganic substances, may be mentioned the vacuum metallizing, sputtering and ion plating processes (by the inorganic substances are meant hereinafter crystalline ceramics and amorphous silicious materials both included).

Of these, the vacuum metallizing is the simplest method, but the energy that can be utilized for coating is only the kinetic energy of evaporated particles within the mean free path, i.e., 0.1 eV or less. Consequently, the penetration of the particles into the substrate is 1 Å or less, resulting in weak coating. The adhesion value of the formed alyer to the substrate is poor and the film density is low, with a consequent low peel strength. When immersed in water, etc., it is liable to peeling off, subject to erosion, and may result in deteriorated resistance to heat and chemicals. Vacuum metallizing is carried out within the mean face path of evaporated particles of the inorganic substances. Hence, attention should be paid to this factor in actual application.

The mean free path of evaporated metal particles increases with decreasing particle weight, increasing degree of vacuum, and rising temperature. Therefore, substances with lower atomic weight and smaller atomic diameter can be coated more easily. The degree of vacuum should be at least $10^{-4}$ Torr, preferably $10^{-5}$ Torr, or below. As one power of 10 difference of the degree of vacuum causes the difference of 10 times of the mean free paths, therefore, the degree of vacuum is the most important parameter in the vacuum metallizing process. For example, in the molten state of ceramics if the degree of vacuum lowers to a level not lower than 100 times of the preset value, the vacuum coating of ceramics will be difficult to control and a layer of desired strength will not be achieved. On the other hand, the mean free path varies with the square root of absolute temperature. Hence, the effect of temperature is not so large. Complex inorganic substances whose components form a molecular compound or have similar mean free path and vaporization rate can be successfully coated by the vacuum metallizing. If not, however, the components dissociated will be coated separately on the substrate, leading to the formation of uneven or weak layers. In these cases, the sputtering process described later is recommended.

As apparent from the above, vacuum metallizing can be easily operated by using a simple and low cost apparatus with a minimum of maintenance cost, but the protective layers formed are least satisfactory except in a few cases.

In the sputtering process, excited particles having larger kinetic energy than in the vacuum metallizing are allowed to strike onto the substrate surface. With the kinetic energy ranging from several 10 to several 100 of electron volts, the metal particles penetrate into the substrate to a depth of from several to several tens of angstroms, producing stronger and more durable coatings than in the vacuum metallizing process.

On the other hand, the material to be coated must be shaped into a target form of special configuration, such as a disc or a column. This adds more cost and provides some limitations in practical application. In addition, the coating speed is the lowest the production cycle the longest among the three vacuum coating processes. This requires more installation costs and manhours in a mass-production system. One of the features of this process is the fact that inorganic substances can be vacuum-coated with no component dissociation in most cases. As opposed to the vacuum metallization, in which the material is evaporated from the molten state, this process produces gases from a solid target through sublimation in which dissociation of the components is difficult to occur. Because of the higher moving speed of gaseous particles the mean free path is longer than in the vacuum metallizing process.

However, when the reaction coating is done by high excitation sputtering, there are some cases where conditions close to the later described ion plating method should be noticed.

The third process is the ion plating method in which coating is conducted with highest energy. This process may be subdivided into several methods. When a method of high coating efficiency is used, penetration of inorganic substances to a depth of several hundred angstroms is achieved with an energy of several KeV.

In contrast to the two vacuum coating processes described above, the ion plating employs cationic particles instead of neutral particles. The positively charged particles are forced to move toward a cathode, that is, the charged substrate, and strike it at a higher velocity than in the sputtering process. Since whereas in vacuum metallizing and sputtering, the particles are almost neutral ones, the cationic particles are cationic, and thus, are smaller in size than the corresponding neutral particles, the mean free path is longer than in vacuum metallizing or sputtering at the same temperature and pressure.

Typical ion plating processes are described below.

(1) Plasma ion plating

A voltage from several 100 to several 1000 V is applied across the coating material and the substrate under a reduced pressure $10 \cdot 10^{-2}$ to $10^{-3}$ Torr to cause glow discharge, and the vaporized neutral particles are ionized in the resultant plasma. This process features high ionizing rate being higher by several tens of percent and the high mechanical strength of the film being formed. Another advantage is the capability of coating also on the back face of the substrate because the particles move along the lines of electric force. However, the substrate must be thermally stable because of the temperature rise of the cathode and the short mean-free-path, special means must be required for coating large-size articles. This process is very suitable for the reaction coating and is advantageously used for the purpose of the present invention.

(2) RF ion plating

This process consists in coating a substrate with evaporated particles of inorganic substances which have been ionized while passing through an RF oscillating coil. Coating is possible with a rather low degree of vacuum from $10^{-3}$ to $10^{-4}$ Torr because the glow discharge is not required. The problems are the low ionizing rate and the difficulty in coating over a wide projected area because of the limited diameter of the RF oscillating coil used despite the advantage that there is little temperature rise in the cathode.

(3) Ion plating under voltage impression

This is a modified plasma ion plating process in which a degree of vacuum ranging from $10^{-4}$ to $10^{-5}$ Torr is used. Although little or no glow is observed visually, the flow of cathode current is actually detected. Fairly good results are obtained at a degree of vacuum lower than about $10^{-4}$ Torr and with a voltage gradient of several tens of V/cm or higher. This method provides effects intermediate between the plasma ion plating and the vacuum metallizing processes.

(4) Ionizing gun process

This process directly produces ionized particles by using an ionizing gun, as opposed to the three processes described above in which particles previously evaporated by resistance heating or electron beams are directly ionized by an electric field, plasma or high frequency waves. Typical examples are the i-gun method and the hollow cathode method, both allowing coating in a high vacuum with a high ionizing efficiency. These techniques are still under development When ion plating is conducted, it is necessary to carry out coating by paying full attention to those features.

In the present invention, the abovementioned various types of vacuum coating have been applied in the most combination thereof according to individual characters of inorganics. As compared with the vacuum coating of metals, the actual operating methods for inorganic substances differ to a considerable extent, which requires special attention. The first point to be considered is the far greater energy required for melting, sublimating or evaporating inorganic substances than that required for metals. Whatever coating processes may be used, the coating time will be longer and the methods for gasification and inonization will be limited. For example, most metals can be melted and gasified by resistance heating using a high melting-point metal, whereas most inorganic substances must be gasified by means of electron beams or ion beams as resistance heating cannot be resed. The second point is the fact that most inorganic substances melt only at the heated part and its neighboring section, as opposed to metals which can be uniformly heated and melted because of the good heat conductivity.

All the inorganic substances used in the present invention have structure of a compound; this results in vacuum coating properties different from metal and also requires attention. Take silicon dioxide for example. When heated with an electron gun, this compound dissociates into silicon, silicon monoxide, oxygen, etc. though only slightly. The oxygen, light in weight is readily excluded from the vacuum system, resulting in the formation of a protective coating deficient in oxygen. When exposed to the air, such an oxygen-deficient film will form a water-soluble siliceous substance, which may cause loss of transperency and turbidity. The present inventors succeeded in overcoming this difficulty by supplying enough oxygen in the coating system or by subjecting the coated film to the reaction coating in the presence of oxygen. One typical example is the vacuum coating of alumina, in which yellow or, even dark brown, coatings are usually formed. However, colorless and transparent alumina film can be vacuum-coated by using the methods described above. The mean free path of inorganic substances is shorter in most cases than that of metals. Hence, severer operating conditions, such as higher degree of vacuum, higher temperature, higher ionization rate, etc., are required for inorganic substances than for metal, other conditions being equal. For example, aluminum can be vacuum-coated on the order of $10^{-4}$ Torr, whereas a degree of vacuum on the order of $10^{-5}$ Torr is required to achieve satisfactory results with silicon dioxide. In the sputtering process, coating speed is far lower in inorganic substances than in metals. In the ion plating processes, on the other hand, problems are the difficulty of ionization and the fact that since the coated film, i.e., the cathode, is an insulator, further ion plating proceeds with extreme difficulty. This is especially the case with the plasma ion plating in which the cathode potential is high and ion current is large.

In such cases, considerable improvements are achieved by installing a separate metal-net cathode in the vicinity of the cathode, instead of using the coated film as the cathode. The plasma ion plating should be carried out in a degree of vacuum between $10^{-3}$ Torr and 1 Torr, preferably on the order of $10^{-2}$ Torr, while maintaining the impressed voltage at a level larger than the ionization voltage and less than about 10 KV. Too high a degree of vacuum may lead to the failure of glow discharge or the disappearance of the dark space; with a too low degree of vacuum, on the other hand, an arc discharge or spark discharge may result. When an ion generator is used, as in the RF ion plating, RF ion gun, and hollow cathode processes, it is possible in some cases to successfully vaccum-coat at a degree of vacuum up to $10^{-4}$ Torr. One of the advantages of the ion plating process is the fact that the mean free path of substance particles becomes longer than in the vacuum metallizing if the ionization rate is sufficiently high and that the mean free path is further lengthened with increasing impressed voltage, thus allowing vacuum coating at decreased degree of vacuum. However, the ionization voltage is higher and the mean free path is shorter in inorganic substances; hence, it is preferable to apply the plasma ion plating at as high an excitation voltage as possible, or to use a hollow cathode or an RF ion gun. In these cases, however, if dissimilar materials with significantly different mean free paths and ion speeds are present, the coated film may be discolored an even or lack in transparency; hence, it is preferable to use materials as chemically uniform as possible. It is also preferable to carry out coating in the presence of oxygen to prevent oxygen deficiency. It is possible to cause metal and a reactive gas such as oxygen and nitrogen to form a layer by reaction vacuum coating.

For example, combination of silicon and oxygen, aluminum and oxygen, and titanium and nitrogen, yield silicon oxides or silicon dioxide film, aluminum oxide film, and titanium nitride film, respectively. In these cases, opaque and electrically conductive layers are sometimes formed with low degree of oxidation, while the translucency or transparency of the films increases and the conductivity decreases, or is completely lost, as the degree of oxidation increases. In many instances, however, the layers formed are colored, and a colorless, transparent film is difficult to obtain.

In the protective film form of this present invention, either a resin protective layer or an inorganic vacuum coating layer may be disposed on the substrate. Choice may be made according to the object. As resin either the above high aryl silicone resin or general resin may be used or as an inorganic vacuum coated layer, ceramics or other inorganics may be separately or in lamination, used but the use in lamination of a high aryl-content silicone resin and a ceramic material is preferable when high resistance to heat, weathering and light is required. The layer mentioned in the present invention is not limited to a layer consisting of a simple substance. The resin and inorganic layers referred to may be a laminate of two or more types of material.

The thus obtained protective film form can show their excellent durability immediately after the manufacture. However, a longer service life can be generally ensured after aging, for example, by: (1) leasing them several days at room temperature, (2) heating at a temperature lower than the heat distortion temperature for several to several tens of hours, or (3) repeating cycles of heating at a temperature lower than the distortion temperature followed by cooling several times.

The protective film form is prepared by laminating a resin layer to an inorganic vacuum coating layer and disposed on a substrate: (1) A small thickness of each protective film is possible as compared with in the single use of a protective film; (2) The two protective layers are firmly bonded together, improving the brittleness and poor impact resistance encountered in articles with an inorganic layer alone; (3) As compared with the case of using a resin layer alone, the composite film thickness of the inorganic and resin films can be reduced, resulting in higher heat transfer, less temperature rise, and prolonged service life; (4) Excellent characteristics of the inorganic substances (resistance to oil, solvents, light, heat and abrasion) and those of the resin (resistance to water, moisture, chemicals and light transmissibility) can be both produced, resulting in excellent properties, physically and chemically; (5) The inorganic substance forms a vacuum-coated layer to form a uniform layer in thickness even on curves of the substrate can be retained uniformly or without patterns being removed; (6) Particularly high heat resistance can be achieved when a high aryl-content silicone resin is used, and especially excellent resistance to heat, weathering, light, solvents and abrasion can be achieved when a ceramic material is vacuum-coated. This combined use ensures unsurpassed overall durability; (7) In the protective film form of the present invention, when the outermost layer of both the protective films is resin the disadvantages of the inner inorganic layer such as poor resistance to chemicals, water and moisture, and brittleness are covered, while the inorganic outermost layer improved the disadvantages of the inner resin layer, such as poor resistance to oil, solvents, light, weathering, heat and abrasion.

The protective film forms 1, 2, 3 and 4 in Table 1 are examples in which an inorganic substance is vacuum-coated on the substrate and the unevenness of the substrate surface are almost completely copied. In contrast, in that in 5, 6, 7 and 8 in Table 1, resin is directly applied to the substrate, yielding a smooth surface with the minute pinholes and roughness completely filled. If desired it is also possible in this case to form patterns and unevenness different from those on the substrate.

Protective forms 1, 2, 3 and 4 have resin layer as the outermost layer, by which the brittleness as well as poor resistance to chemicals, water and moisture of the inner inorganic layer are covered up. In articles 5, 6, 7 and 8 in Table 1, on the other hand, the disadvantages of the inner layer, such as poor resistance to oil, solvents, light, weathering, heat and abrasion are improved by the vacuum-coated inorganic outermost layer. Therefore, which type of material should be used as the uppermost layer may be determined by the intended uses.

EXAMPLE 1

An aluminum sheet 0.1 cm thick was shaped into a paraboloid shade, 15 cm high and 30 cm in diameter, finished to the hair-line, degreased, cleaned and dried. It was put into the bell jar in a vacuum coater and held on a rotating Holder 20 cm above the hearth liner. After evacuating the system to $1 \times 10^{-5}$ Torr, silicon oxide was evaporated by electron beam in the air atmosphere, and vacuum coating was conducted for seven minutes at an impressed voltage of $-0.5$ KV, an EB output power of 1 to 1.5 KW and a coating pressure of 5 to $6 \times 10^{-5}$ Torr, as shown in 1 in Table 2. While the substrate temperature was being maintained at 150° C., vacuum metallizing was done for 7 minutes. All the surface of the paraboloid shade with a transparent alumina protective film thus obtained was coated with melamine resin and cured by heating. The three-layer protective film form thus prepared showed no abnormal change after immersion in city water for three days. No change was also observed when this was immersed for 30 minutes in common organic solvents, such as alcohols, esters and petroleum ether, 10% aqueous hydrochloric acid, caustic soda and copper chloride solutions, indicating its excellent resistance to water, solvents and chemicals. Aluminum reflecting shade having melamine resin protective film of flame retardance is can fully develope reflectivity as well as anticorrosin and heat resistance effect is also good, making it best suited as an illumination shade for interior use. Furthermore, the melamine resin can be easily colored as desired and makes itself suitable for use as an interior decorative material.

EXAMPLE 2

A glass plate measuring 0.1 cm × 10 cm × 10 cm was degreased, cleaned, dried and put into the bell jar in a vacuum coater. It was held at 4 cm above an RF oscillator coil 10 cm in height and 10 cm diameter, which is installed 8 cm directly above the hearth liner. After evacuation to $2 \times 10^{-5}$ Torr, oxygen was introduced to a pressure of $5 \times 10^{-3}$ Torr, and the system was again evacuated to $2 \times 10^{-5}$ Torr, the same procedure being repeated two times. As shown in Table 2, 2, silicon was evaporated by electron beams with the substrate maintained at room temperature, and vacuum coating was carried out for seven minutes at an impression voltage of 00.7 KV, an EB output power of 1 KW, a coating pressure of 2 to $3 \times 10^{-4}$ Torr, an RF output power of 400 W and a frequency of 13.56 MHz.

The translucent protective film of silicon oxide layer obtained was coated with a solution of a thermosetting polyester resin. The three-layer article cured by heating showed no abnormal change after heating in an oven maintained at 150° C. No abnormal change was also observed after immersion in city water for five days, or in 10% aqueous hydrochloric acid, sulfuric acid and caustic soda solutions for 30 minutes. The lansluvent film of silicon oxide is capable of cutting off infrared rays. This makes it suitable for use as cold mirrors, as well as automobile and building window panes for screening infrared rays.

EXAMPLE 3

An acryloyl polyester sheet was cut to 0.2 cm × 20 cm × 20 cm, degreased, cleaned and dried. It was put into the bell jar in a vacuum coater, and held at 25 cm above the hearth liner in parallel. After evacuation to $2 \times 10^{-5}$ Torr, silicon oxide was evaporated by electron beams in the air atmosphere, and vacuum coating was conducted for seven minutes at an impression voltage of $-0.4$ KV, an EB output power of 0.5 KW and a coating pressure of $6 \times 10^{-5}$ Torr, as shown in 3 in Table 2. The substrate was maintained at room temperature.

On the obtained light-transmissible silicon oxide protective film coated layer thus formed was further coated with a high aryl-content silicone resin having a phenyl radical (phenyl radical+methyl radical) ratio of 83.6 mole %, and cured by heating. The three-layer structure protective film forms showed no abnormal change after testing in an oven maintained at 180° C. No abnormal change was also observed after immersion in city water for five days, or in 10% aqueous hydrochloric acid, sulfuric acid and caustic soda solutions for 30 minutes. The resistance to solvents of this layer is far higher than other common resins, such as polyester and melamine resins. In addition to these excellent resistance to heat, water, chemicals and solvents, this protective layer cuts off ultraviolet rays, thus protecting the substrate resin from detrioration. Because of the transparency which allows the color of the inner melamine resin layer to be clearly seen, as well as its light weight, stiffness and high heat insulating property, this form is suitable as interior decorative materials.

EXAMPLE 4

A glass plate measuring 0.1 cm × 10 cm × 10 cm was degreased, cleaned, dried and put into the bell jar in a vacuum coater. It was held at 4 cm above an RF oscillator coil which is installed 8 cm directly above the hearth liner. After evacuating the system to $2 \times 10^{-5}$ Torr, oxygen gas was introduced to a pressure of $5 \times 10^{-3}$ Torr and the system was evacuated again to $2 \times 10^{-5}$ Torr, as shown in 4 in Table 2. This operation was repeated twice. Silicon was evaporated by electron beams with the substrate maintained at room temperature, and vacuum coating was conducted for seven minutes in the oxygen atmosphere at an impression voltage of $-0.7$ KV, an EB output of 1 KW, a coating pressure of 2 to $3 \times 10^{-4}$ Torr, an RF output of 400 W, and an frequency of 3.65 MHz.

The translusent silicon oxide layer thus formed was further coated with a high aryl-content silicone resin having a phenyl radical/(phenyl radical+methyl radical) ratio of 83.6 mole %, and cured by heating. The three-layer form thus prepared showed no abnormal change after testing in an oven maintained at 180° C. No abnormal change was also observed after immersion in city water for five days, or no corrosion in 10% aqueous hydrochloric acid, sulfuric acid and caustic soda solutions for 30 minutes. This is not attacked by organic solvents such as petroleum ether, acetone, esters and hexane, and the resistance to solvents is far higher than other common resin protective films such as polyester resin and melamine resin. In addition to such high resistance to heat, water, chemicals and solvents, the high-aryl silicone resin protective film cuts off ultraviolet rays and the silicon oxide translucent film shields infrared rays. This makes the protective form best suited as cold mirrors as well as filter glass which transmit visible rays alone.

EXAMPLES 5 and 6

The surfaces of an aluminum and a copper sheet, each measuring 0.1 cm×20 cm×20 cm, are degreased, cleaned, dried, and separately put into the bell jar in a vacuum coater. Each piece was held at 25 cm directly above the hearth liner in parallel. After evacuation to a pressure of $1\times10^{-5}$ Torr, oxygen was introduced to a pressure of $5\times10^{-3}$ Torr and the system was again evacuated to $1\times10^{-5}$ Torr. This operation was repeated twice. Pyroceram (Example 5) and alumina (Example 6) were evaporated by heating with electron beams in the oxygen atmosphere with the substrate maintained at room temperature. The vacuum coating conditions were: impression voltage −0.7 KV, EB output 1 KW, coating pressure 6 to $7\times10^{-5}$ Torr, and coating time seven minutes for Example 5; impression voltage −0.5 KV, EB output power 1.5 KW, coating pressure 2 to $3\times10^{-4}$ Torr, and coating time seven minutes for Example 6.

The whole surface of the aluminum plate having a pyroceram light-transmissible protective coating obtained in Example 5 was coated with melamine resin, and the whole surface of the copper plate having the light-transmissible alumina protective film obtained in Example 6 was coated with thermo-setting polyester resin.

The three-layer protected articles after curing by heating showed no abnormal change when immersed in city water for three days. No corrosion was also observed after immersion in organic solvents, such as alcohols, petroleum ether and esters, or in 10% aqueous hydrochloric acid, sodium hydroxide and copperchloride solutions for 30 minutes. With such a high resistance to water, solvent and chemicals, as well as the excellent transparency of the protective film which allows the color and luster proper to metal to be clearly seen, these forms are suitable as durable interior and exterior materials for buildings. Particularly, when used as illumination shades of various shapes, graceful lighting fixtures for interior use can be obtained.

EXAMPLE 7

An aluminum sheet measuring 0.1 cm×20 cm×20 cm was degreased, cleaned, dried and put into the bell jar in a vacuum coater. It was held at 25 cm directly above the hearth liner in parallel. After evacuation to $2\times10^{-5}$ Torr, oxygen gas was introduced to a pressure of $5\times10^{-3}$ Torr and the system was again evacuated to $2\times10^{-5}$ Torr, as shown in 7 in Table 2. This operation was repeated twice. Mullite was evaporated by heating with electron beams in the oxygen atmosphere, and vacuum coating was carried out for seven minutes with the substrate maintained at 180° C. at an impression voltage of −0.7 KV, an EB output of 1.5 KW and a coating pressure of 4 to $5\times10^{-4}$ Torr.

The whole surface of the form thus obtained having the transparent mullite protective film was coated with a high aryl-content silicone resin having a phenyl radical/(phenyl radical+methyl radical) ratio of 83.6 mole %, and heat cured by heating. The three-layer protective film form thus prepared showed no abnormal change after testing in an oven maintained at 180° C. No abnormal change was also observed after immersion in city water for five days, or no corrosin in 10% aqueous hydrochloric acid, sulfuric acid, caustic soda and copper chloride solutions for 30 minutes. The resistance to solvent is far higher than common resins such as polyester and melamine resins. In addition to such excellent protective effects such as good resistance to heat, water, chemicals and solvents on the substrate, this transparent protective film allows not only high resistance to corrosion but also the silver luster characteristic to aluminum to be clearly seen. Thus the articles manufactured according to the method of this example are suitable as interior, exterior and decorative materials in buildings.

EXAMPLE 8

A copper sheet measuring 0.05 cm×10 cm×10 cm was degreased, cleaned, dried and put into the bell jar in a vacuum coater. It was placed at 4 cm above an RF oscillator coil 10 cm in diameter and height, which is installed at 8 cm directly above the hearth liner. After evacuation to $2\times10^{-5}$ Torr, oxygen gas was introduced to a pressure of $5\times10^{-3}$ Torr and the system was again evacuated to $2\times10^{-5}$ Torr, as shown in 8 in Table 2. This operation was repeated twice. Alumina was evaporated by electron beams with the substrate maintained at room temperature, the evaporated aluminum vapor was passed through the RF oscillating coil, and vacuum coating was carried out for seven minutes at an impression voltage of −0.7 KV, an EB output power of 1 to 1.5 KW, a coating pressure of 4 to $5\times10^{-4}$ Torr, an RF output of 400 W and a frequency of 13.56 MHz.

The whole surface of the copper sheet coated with the light-transmissible alumina protective film was further coated with a high aryl-content silicone resin having a phenyl radical/(phenyl radical+methyl radical) ratio of 83.6 mole %, and cured by heating. The three-layer protected protective film form thus obtained showed no change after testing in an oven maintained at 180° C. No abnormal change was also observed after immersion in city water for five days, or in 10% aqueous hydrochloric acid, sulfuric acid, caustic soda and copper chloride solutions for 30 minutes no corrosion was seen. The resistance to solvents is far higher than common resins such as polyester and melamine resins. In addition to such high protective effects such as resistance to heat, water, chemicals and solvent on the substrate, this protective film allows not only high resistance to corrosion but also the characteristic color and luster of copper as well as patterns made on the metal to be clearly seen. Thus the protective film form is suitable as beautiful, interior, exterior and decorative materials for buildings. This process may also be applied to the manufacture of illumination shades for interior lighting fixtures.

EXAMPLE 9

A smooth silver sheet measuring 0.1 cm×20 cm×10 cm was shaped into a paraboloid reflecting shade, degreased, cleaned, dried, coated on the whole surface with a thermo-setting polyester resin, and cured by heating. This was put into the bell jar in a vacuum coater and held on a rotating holder installed at 20 cm above the hearth liner. After evacuation to $1 \times 10^{-5}$ Torr, silicon oxide was evaporated by heating with electron beams in the air atmosphere with the substrate maintained at room temperature. Vacuum coating was conducted for five minutes at an impression voltage of $-0.2$ KV, an EB output power of 0.5 KW and a coating pressure of 4 to $6 \times 10^{-5}$ Torr, as shown in 9 in Table 2.

The thus obtained three-layer shaped form of silver having the light-transmissible silicon oxide protective film showed no abnormal change after testing in an environment maintained at 40° C. and 90% relative humidity for five days, for moisture test and in an oven kept at 180° C. for heat test. No scratches was formed on the protective film surface when the surface was rubbed with gauze. In addition to such an excellent resistance to abrasion, heat and moisture, the luster characteristic to silver can be clearly seen as it is. The light reflectivity is also good and no discoloration occurs when exposed to the sulfur atmosphere. These features make this article best suited as lighting reflecting shades used in bathrooms and other places in hot-spring resorts.

EXAMPLE 10

A glass plate measuring 0.1 cm×10 cm×10 cm was coated with a polyurethane resin, dries and cured. This was put into a sputtering apparatus and held on a substrate holder. An indium oxide plate was used as the target, which was kept 10 cm apart from the substrate. After evacuation to $3 \times 10^{-6}$ Torr, a gaseous mixture of argon and 10% oxygen was introduced to a pressure of $9 \times 10^{-3}$ Torr. With the shutter closed, a cleaning sputtering was conducted for five minutes at an output power of 0.7 KW and a frequency of 13.56 MHz to clean the target surface and ensure cleaning of the target surface and stabilization of discharge. The shutter was opened and the sputtering of indium oxide was carried out for 100 minutes at a relatively low temperature and low coating speed.

The thus obtained protective film form having a light-transmissible indium oxide layer showed no abnormal change when left in the environment of 90% relative humidity at room temperature for moisture test. Because of its capability of reflecting infrared rays, this sheet is suitable as window panes for vehicles, such as cars and trains, to obtain more refleshing atmosphere inside the air-conditioned car.

EXAMPLES 11 and 12

A sheet of brass measuring 0.05 cm×20 cm×20 cm was coated with a thermo-setting polyester resin. Separately, a sheet of slate measuring 0.5 cm×20 cm×20 cm, with its whole surface coated with a melamine resin, and cured. Each piece was separately put into the bell jar in a vacuum coater and held at 30 cm directly above the hearth liner in parallel. After evacuation to $2 \times 10^{-5}$ Torr, oxygen was introduced to a pressure of $5 \times 10^{-3}$ Torr and the system was evacuated to $2 \times 10^{-5}$ Torr again. This operation was repeated twice. Alumina (Example 11) and mullite (Example 12) were evaporated by heating with the substrate maintained at room temperature in both cases, and vacuum coating was carried out for five minutes. The coating conditions were: impression voltage $-0.5$ KV, EB output 1 to 1.5 KW and coating pressure 5 to $6 \times 10^{-4}$ Torr.

The brass plate having a transparent alumina protective film and slate sheet having a mullite protective film obtained showed no abnormal change after immersed in city water or rainwater for three days. No scratches was formed on the protective film surface when the surfaces were strongly rubbed with gauze. They are not attacked by oils and common solvents such as alcohols, acetone, petroleum ether and hexane and have good abrasion, water and solvent resistance. With these characteristic features, the brass plate of Example 11 is useful as interior, exterior and decorative materials with excellent corrosion resistance which allow the metallic color and luster to be clearly seen. The process for Example 11 is also used for the manufacture of lighting shades of various shapes having the features as described above and suitable for interior use. The slate sheet of Example 12, on the other hand, is protected with the abovementioned protective film.

EXAMPLE 13

A bright-finish aluminum sheet measuring 0.1 cm×30 cm×30 cm was coated with a high aryl-content silicone resin having a phenyl radical/(phenyl radical+methyl radical) ratio of 83.6 mole %, and cured by heating. It was put into the bell jar in a vacuum coater and held at 30 cm directly above the hearth liner in paralle. After evacuation to $1 \times 10^{-5}$ Torr, borosilicate glass was evaporated by heating with electron beams in the air atmosphere, and vacuum coating was carried out for 20 minutes at an impression voltage of $-0.2$ KV, an EB output of 0.5 KW and a coating pressure of 3 to $5 \times 10^{-5}$ Torr, as shown in 13 in Table 2. The substrate was maintained at 200° C.

The thus obtained three-layer protective film form with the light-transmissible borosilicate glass coating was fixed to a square, halogen lamp lighting fixings and the lamp was turned on raised to 150° C. and kept at the temperature for 24 hours, or it was left for 3 days at room temperature and at a highly humid environment of 90% RH. There was observed no change in the sheet. No abnormal change was also noticed in each case. This is not attacked by oils, ketones, solvents such as general hydrocarbone. With such excellent resistance to heat, moisture and chemicals, as well as high corrosion resistance, this form is suitable for sodium lamps and other types of lighting fixtures built on roads and in tunnels. Furthermore, the reflectivity of the bright-finish aluminum sheet can be exhibited as it is and by its simple manufacturing process good and cheap lighting fixings can be obtained.

EXAMPLE 14

A thermo-setting polyester resin sheet measuring 0.2 cm×10 cm×10 cm, with its whole surface coated with a high aryl-content silicone resin having a phenyl radical/(phenyl radical+methyl radical) ratio of 83.6 mole %, was held on the holder in the bell jar of a sputtering apparatus. A plate of silicon oxide was used as the target, which was held 20 cm apart from the substrate. After evacuating to $4 \times 10^{-6}$ Torr, the temperature in the bell jar was raised to 150° C. for baking, and argon gas was introduced to a pressure of $1\times10^{-3}$ Torr. With the shutter closed, a cleaning sputtering was carried out for five minutes at an output power of 4.5 KW and a frequency of 13.56 MHz, to clean the target surface and ensure stabilization of discharge. The shutter was opened and silicon oxide was sputtered for 50 minutes. Such a high-temperature and high-speed sputtering poses various problems when a common resinous material is used in the system. However, the use of the high aryl-content silicone resin as defined above encludes all of these problems, allowing successful operation of sputtering and resulting to the formation of a protective layer with excellent adhesion between the layers. The three-layer protective film form with the transparent silicon oxide thus obtained and showed no abnormal change when left in an atmosphere of 90% relative humidity at room temperature for three days. This is not attacked by oils, ketones, solvents such as general hydrocarbons, indicating good resistance to solvents and moisture. As compared with conventional glass-based plates, this sheet is light in weight, difficult to break, has high safety and good insulating properties. In addition, it is capable of cutting off ultraviolet rays. With these characteristic features, it is useful as safe window panes for housing to protect furniture from discoloration and deterioration.

EXAMPLE 15

A copper medal 0.3 cm in thickness and 10 cm in diameter was coated with a high aryl-content silicone resin having a phenyl radical/(phenyl radical+methyl radical) ratio of 83.6 mole %, and cured by heating. It was put into the bell jar in a vacuum coater and held at 25 cm directly above the hearth liner in parallel. After evacuating to $1\times10^{-5}$ Torr, oxygen was introduced to a pressure of $5\times10^{-3}$ Torr and the system was again evacuated to $1\times10^{-5}$ Torr. This operation was repeated twice. Zirconium ceramic was evaporated by heating with electron beams while maintaining the oxygen partial pressure at 5 to $6\times10^{-4}$ Torr, and vacuum coating was carried out for seven minutes at an impression voltage of $-0.7$ KV, an EB output of 1.5 KW, and a coating pressure of 5 to $6\times10^{-4}$ Torr, as shown in 15 in Table 2. The substrate was maintained at room temperature. No scratches was formed on the surface of the zirconium protective coating when strongly rubbed with gauze. It also showed no abnormal change when left in an atmosphere of 90% relative humidity at room temperature for five days. A cross cut test showed no peeling, indicating its excellent adhesion. The color and luster peculiar to the copper medal as well as the patterns and letters engraved remain as they are without corrosion and can be stored permanently without any change. This process is also applicable to common copper plates protected with a protective film of a high-aryl silicone resin and zirconium. These protected copper plates are advantageously used as interior, exterior and decorative materials in buildings with excellent corrosion resistance and durability.

EXAMPLE 16

An epoxy resin sheet measuring 0.3 cm × 10 cm × 10 cm was coated with a high aryl-content silicone resin having a phenyl radical/(phenyl radical+methyl radical) ratio of 83.6 mole %, and cured by heating. It was put into the bell jar of a vacuum coater, and held at 4 cm above an RF oscillating coil 10 cm in height and diameter which is installed at 8 cm directly above the hearth liner. After evacuating to $1\times10^{-5}$ Torr, oxygen was introduced to a pressure of $5\times10^{-5}$ Torr and the system was again evacuated to $1\times10^{-5}$ Torr. This operation was repeated twice. Alumina was evaporated by heating with electron beams with the substrate maintained at room temperature, the evaporated gases was passed through the coil. And vacuum coating was conducted for five minutes at an impression voltage of $-0.5$ KW, an EB output of 1.0 to 1.5 KW, a coating pressure of 5 to $6\times10^{-4}$ Torr, an RF output of 500 W and a frequency of 13.56 MHz, as shown in 16 in Table 2.

The three-layer protective film form with the light-transmissible alumina protective coating thus obtained showed no scratches when strongly rubbed with gauze. No abnormal change was also observed after leaving it in an oven maintained at 180° C., or after immersion in city water or rainwater for three days. This is not attacked by common solvents such as alcohols, acetone, petroleum ether and hexane. There was no deterioration observed after continuous exposure under an ultraviolet lamp for five days. Thus the inner epoxy resin substrate can be protected from damages due to ultraviolet rays and hydrolysis, making it suitable as exterior materials having good resistance to weathering for a prolonge service life.

Table 1 lists the embodyments of the present invention, and Table 2 illustrates the processing conditions of each embodyment.

TABLE 1

| layer no. | | Multi-layer Protective Coatings of the Present Invention | | | | | | | |
|---|---|---|---|---|---|---|---|---|---|
| | | | 3 layers | | | | | | |
| | materials | 1 | 2 | 3 | 4 | 5 | 6 | 7 | 8 |
| 3 | second protective layer | resin inorganics (vacuum coated) | O | | O | | | O | | O |
| 2 | first protective layer | resin inorganics | O | O | | | O | O | | |
| 1 | substrate | nonmetal or metal | O | O | O | O | O | O | O | O | note.
O stands for general materials
  stands for high aryl silicon resins
  stands for ceramic materials

TABLE 2

| | | Processing Conditions for Multi-layer Protective Coatings of the Present Invention | | | | | | | |
|---|---|---|---|---|---|---|---|---|---|
| layer no. | | | 3 layers | | | | | | |
| | materials | 1 | 2 | 3 | 4 | 5 | 6 | 7 | 8 |
| 3 | second protective layer | resin inorganics atmosphere applied voltage | melamine resin | polyester resin | high aryl silicone resin | high aryl silicone resin | melamin resin | polyester resin | high aryl silicone resin | high aryl silicone resin |

TABLE 2-continued

Processing Conditions for Multi-layer Protective Coatings of the Present Invention

| | | | 9 | 10 | 11 | 12 | 13 | 14 | 15 | 16 |
|---|---|---|---|---|---|---|---|---|---|---|
| 2 | first protective layer | EB output coating pressure, time resin inorganics | alumina | silicon | silicon oxide | silicon | pyroceram | alumina | mullite | alumina |
| | | atmosphere | oxygen | argon | air | oxygen | air | oxygen | oxygen | oxygen |
| | | applied voltage | −0.5 KV | −0.7 KV | −0.4 KV | −0.7 KV | −0.7 KV | −0.5 KV | −0.7 KV | −0.7 KV |
| | | EB output | 1–1.5 KW | 1 KW | 0.5 KW | 1 KW | 1 KW | 1.5 KW | 1.5 KW | 1–1.5 KW |
| | | coating pressure (Torr), | $5-6 \times 10^{-5}$ | $2-3 \times 10^{-4}$ | $6 \times 10^{-5}$ | $2-3 \times 10^{-4}$ | $6-7 \times 10^{-5}$ | $2-3 \times 10^{-4}$ | $4-5 \times 10^{-4}$ | $4-5 \times 10^{-4}$ |
| | | time (min.) | 7 | 7 | 7 | 7 | 7 | 7 | 7 | 7 |
| 1 | substrate | nonmetal | | glass | APP | glass | | | | |
| | | metal | Al | | | | Al | Cu | Al | copper |
| | | | applied voltage | RF | applied voltage | RF reaction | applied voltage | applied voltage | applied voltage | RF |

| layer no. | | materials | 3 layers | | | | | | | |
|---|---|---|---|---|---|---|---|---|---|---|
| | | | 9 | 10 | 11 | 12 | 13 | 14 | 15 | 16 |
| 3 | second protective layer | resin inorganics | silicon oxide | indium oxide | alumina | mullite | borosilicate glass | silicon oxide | zirconium | alumina |
| | | atmosphere | air | argon-oxygen mixture | oxygen | oxygen | air | argon | oxygen | oxygen |
| | | applied voltage | −0.5 KV | | −0.5 KV | −0.5 KV | −0.2 KV | | −0.7 KV | −0.5 KV |
| | | EB output | 0.5 KW | | 1.5 KW | 1–1.5 KW | 0.5 KW | | 1.5 KW | 1–1.5 KW |
| | | coating pressure, time | | $9 \times 10^{-3}$ | $5-6 \times 10^{-4}$ | $5-6 \times 10^{-4}$ | $3-5 \times 10^{-5}$ | $1 \times 10^{-3}$ | $5-6 \times 10^{-4}$ | $5-6 \times 10^{-4}$ |
| | | | | 100 | 5 | 5 | 20 | 50 | 7 | 5 |
| 2 | first protective layer | resin | | polyester resin | | | | | | |
| | | inorganics atmosphere applied voltage EB output coating pressure (Torr), time (min.) | | | | | | | | |
| 1 | substrate | nonmetal | | glass | | slate | | polyester | | epoxy resin |
| | | metal | Ag | | brass | | bright-finish aluminum plate | | copper medal | |
| | | | applied voltage | sputtering method | applied voltage | applied voltage | applied voltage | sputtering method | applied voltage | RF |

What is claimed is:

1. A multi-layer coated article comprising a substrate and two protective layers, said substrate being sufficiently thermal resistant to withstand the conditions of vacuum deposition thereon and not evolving volatile substances when vacuum deposition is carried out thereon, said protective layers consisting of a vacuum-deposited crystalline layer of at least one thermally stable water-insoluble inorganic compound selected from the group consisting of metallic oxides, nitrides, borides, carbides and silicides and a hard abrasion resistant high bending resistant thermosetting resin layer capable of withstanding a vacuum-deposition operation thereon comprised of a cross-linked resin selected from the group consisting of epoxy resins, polyester resins, allyl resins, phenol resins and silicone resins, which protective layers are in any desired order.

2. A multi-layer coated article as set forth in claim 1, wherein said substrate is coated with said vacuum-deposited inorganic compound and said vacuum-deposited inorganic compound layer is further coated with said resin layer.

3. A multi-layer coated article as set forth in claim 1, wherein said substrate is coated with said resin layer and said resin layer is further coated with said inorganic compound.

4. A multi-layer coated article as set forth in claim 1, wherein a crystalline ceramic material is used for the vacuum depositing.

5. A multi-layer coated article as set forth in claim 4, wherein said ceramic material is molten at a set degree of vacuum ranging from $10^{-1}$ to $10^{-5}$ Torr and the vacuum depositing is conducted at a degree of vacuum not lower than 100 times the preset value.

6. A multi-layer coated article as set forth in claims 1, 2 or 3 wherein said resin layer is composed of a high aryl-content silicone resin having an aryl radical/(aryl radical+alkyl radical) mole % of 65 to 100%.

7. A multi-layer coated article as set forth in claim 6, wherein said resin layer is composed of a polyarylalkylsiloxane having an aryl radical/(aryl radical+alkyl radical) mole % of 65 to 100%, containing two to three polymerizable functional groups, and having a ratio of carbon atoms to silicon atoms of 4.25 to 16.

8. A multi-layer coated article as set forth in claims 1, 2 or 3 wherein said vacuum-deposited inorganic compound is a ceramic selected from the group consisting of oxide ceramics, high alumina and mullite ceramics, zircon ceramics and lithia ceramics.

9. A multi-layer coated article as set forth in claims 1, 2 or 3 wherein said resin layer is composed of a polyarylalkylsiloxane having an aryl radical/(aryl radical+alkyl radical) mole % of 65 to 100%, and said vacuum-deposited layer is composed of a ceramic.

10. A multi-layer coated article as set forth in claims 1, 2 or 3, wherein said inorganic compound is vacuum-deposited in an atmosphere of oxygen.

11. A multi-layer coated article as set forth in any of claims 1, 2 or 3 wherein said inorganic compound is an oxide or nitride.

12. A multi-layer coated article as set forth in any of claims 1, 2 or 3 wherein said inorganic compound is a boride, carbide or silicide of a transition element.

13. A multi-layer coated article as set forth in any of claims 1, 2 or 3 wherein said inorganic compound is a carbide of a non-transition element.

* * * * *